United States Patent [19]

Stout, III

[11] Patent Number: 4,571,838

[45] Date of Patent: Feb. 25, 1986

[54] DIRECT READOUT CENTERLINE MEASURING DEVICE AND PROCESS

[76] Inventor: Wesley Stout, III, 228 S. Green St., Apt. A, Brownsburg, Ind. 46112

[21] Appl. No.: 601,615

[22] Filed: Apr. 18, 1984

[51] Int. Cl.[4] .............................................. G01B 5/25
[52] U.S. Cl. ................................. 33/169 C; 33/169 B
[58] Field of Search .......................... 33/169 B, 169 C

[56] References Cited

U.S. PATENT DOCUMENTS

| | | | |
|---|---|---|---|
| 2,533,198 | 12/1950 | Radtke | 33/169 C |
| 3,137,943 | 6/1964 | Mechaneck | 33/169 B |
| 3,470,618 | 10/1969 | Richer | 33/169 C |
| 3,999,299 | 12/1976 | Johnson | 33/169 C |

Primary Examiner—Robert I. Smith
Attorney, Agent, or Firm—Wallace E. Weakley

[57] ABSTRACT

A Direct Readout Centerline Measuring Device and Process usable with standard height gages, dial height gages, electronic height gages, and angle protractors, to obtain a direct read out of centerline locations for fast accurate inspection lay-out, jig and fixture work, thereby eliminating common read out errors, and allowing direct readout of center line locations in much less time than is normally required with conventional types of measuring equipment.

5 Claims, 4 Drawing Figures

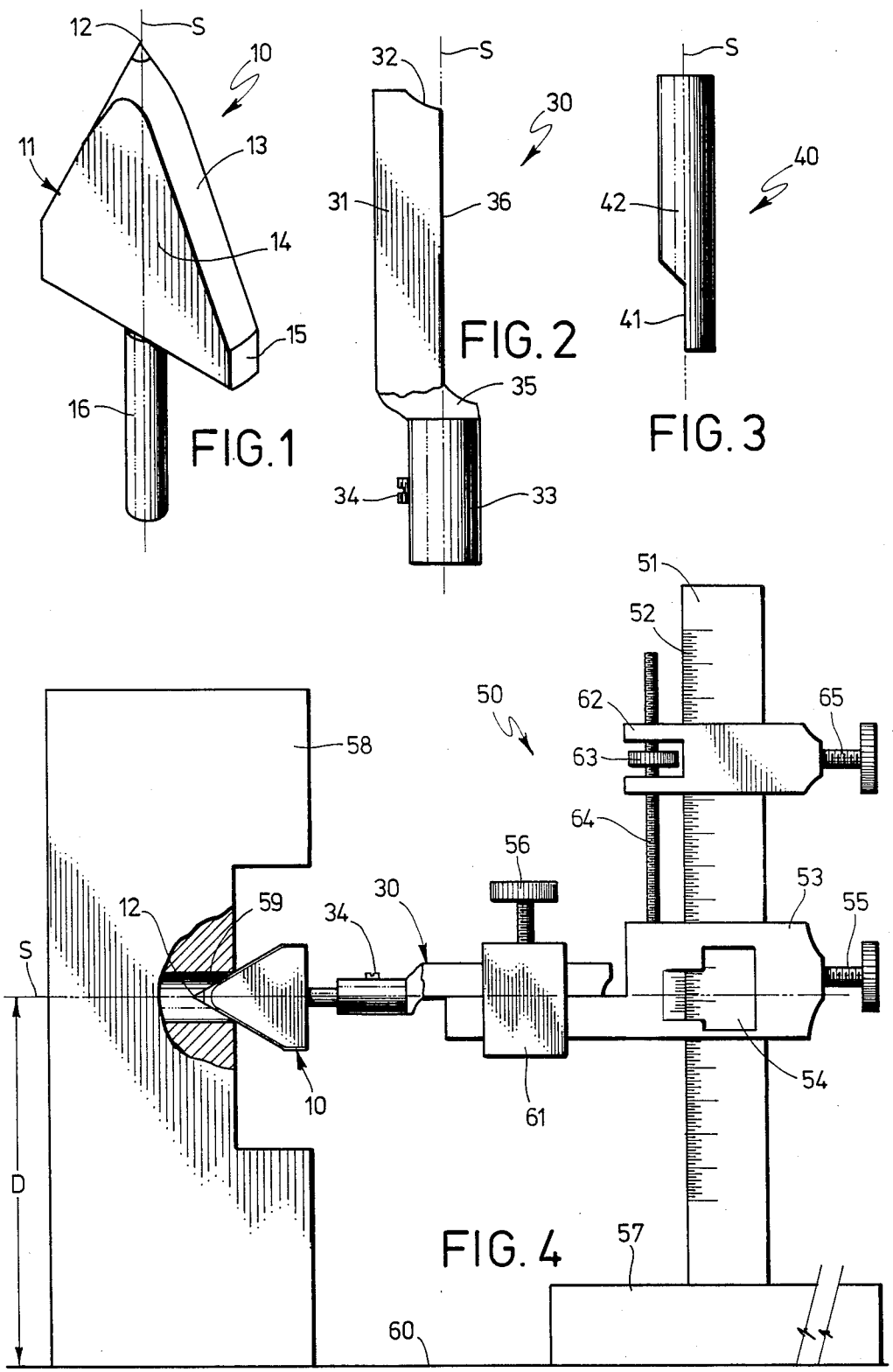

DIRECT READOUT CENTERLINE MEASURING DEVICE AND PROCESS

BACKGROUND OF INVENTION

1. Field of the Invention

This invention relates generally to center-line measuring tools for direct read out of measurements of centerline locations and dimensions of parts to be measured or layed out for manufacturing, which device and method will accomplish the measurement in less time than by conventional tooling and methods.

2. Description of the Prior Art

There are many known types of inspection measuring devices and equipment available today, However, most of the commonly used devices require to much time to perform the measurements. In addition, numerous calculations must be made from multiple measurement readings to arrive at the needed measurements and dimensions. U.S. Pat. No. 2,354,1372 Nystrom discloses a typical height gage used in combination with a dial indicator to determine the center-line location of a hole or bore. However, multiple settings of the instruments must be made to determine the exact location of the center-line of the bore. U.S. Pat. Nos. 2,536,625 to Button, 3,106,0222 Milan, and 2,346,0632 Bardega disclose conventional height gages and vernier gages for determining height locations and center-line locations. However, none of these instruments utilize the structure or process according to the present invention to accurately locate center-line dimensions.

U.S. Pat. No. 2,472,4312 Marcil utilizes a universal height gage attachment that is spring loaded to make a longitudinal or vertical height measurement. However, neither the structure nor the method used by Marcil is the same as that utilized by the subject invention.

SUMMARY OF THE INVENTION

One of the objects of the present invention is to present a device for making fast and accurate measurements and locations of center-line dimensions without requiring multiple calculations or computations.

Another object of the present invention is to present a method or process of obtaining center-line dimension locations in a one step process, as opposed to a multiple calculation process.

A still further object of a present invention is to present a device and process for doing machine lay-out work in much less time than is generally required by using current state of the art measurement and lay-out equipment.

These objects as well as other objects and advantages of the present invention will be recognized upon viewing the accompanying drawings in light of the description contained in the preferred embodiments.

BRIEF DESCRIPTION OF THE DRAWINGS

FIG. I. Is a perspective View of one of the embodiments of the subject invention;

FIG. II. Is a side view of a tool holder utilizing the construction according to the present invention;

FIG. III. Is a side view of another embodiment according to the present invention; and FIG. IV. Is a vertical side view showing the embodiment of the present invention illustrated in FIG. I. being utilized in a conventional height gage.

DESCRIPTION OF THE PREFERRED EMBODIMENTS

The preferred embodiments of the present invention will now be described with reference to the accompanying Figures.

Referring to FIG. I. of the drawings, one of the preferred embodiments of the subject invention will now be described. The hole center locating tool is shown generally at 10. The hole center locating tool 10 is formed of a generally triangular or spade-like configuration 11. Two of the angled surfaces 13 have a generally rounded or conical surface or configuration ending in a hardened point 12. The hole center locating tool or spade portion 11 has two opposite flat surfaces 14, with two surfaces 15 being of generally cylindrical configurations. The flat surface opposite the hard point 12 has a cylindrical stem secured thereto. The center line of the cylindrical stem 16 is in alignment with and passes through the hardened point 12 of the spade portion 11.

Use of the hole center-line measuring device and process shown in FIG. I will now be described in detail with reference to FIG. IV of the drawings. In FIG. IV, a conventional height gage 50 is being used with the preferred embodiment of the present invention 10 for determining the location of the center-line S of the hole 59 by determining the height D from the flat in plate 60.

The height gage assembly 50 consists of a height gage 51 having a height gage or vernier scale 52 along the flat side thereof. The height gage 51 is mounted on a base 57 for placement on a flat inspection plate 60. A slide assembly 53 is adapted for movement along the length of the height gage 51 as is well known in the Prior Art. The slide assembly 53 has an opening 54 therethrough for viewing the vernier scale 52 on the height gage 51. The slide 53 may be locked in place along the length of the height gage 51 by means of a set screw 56. The end of the slide 53 opposite the set screw 56 has a hole therein, with the center line of the hole corresponding to the centerline read-out line in the opening or centerline window 54.

In use, the cylindrical stem 16 of the hole centerline locating tool 10 is inserted into the hole or opening in the end of the slot 53 and is locked in place by means of a set screw 56. The center line of the cylindrical stem 16 and the point 12 on the locating and measurement tool 10 allign with the center line indicia viewed through the opening or centerline window 54 of the slide 53. The drive mechanism 55 is rotated to move the slide 53 up or down vertically relative to the flat inspection plate surface 60 until the hole center locating tool 10 is aligned precisely with the opening of the hole or bore 59. When the hole center line locating tool 10 is aligned with the opening of hole 59, the location D of the center line S of the hole 59 may be read directly from the height gage scale 52 through the opening or window 54.

FIG. II. illustrates a tool holder 30 according to the present invention which has a rectangular tool post 31 with flat 36 thereon. The flat 36 is in alignment with the centerline of the tool receptical cylinder stem 33. A small radius 32 is formed in the outer end of the rectangular tool post 31. The rectangular tool post 31 maybe machined as a part of cylindrical stem 33 or may be attached thereto by welding as shown at 35. A set screw 34 is used to hold tools within a bore extending into the cylindrical stem 33.

FIG. III illustrates a cylindrical tool holder 40 according to the present invention. The cylindrical tool holder 40 has a flat surface 41 formed thereon, which flat surface aligns with the center line of a cylindrical portion or section 42. The cylindrical tool holder 40 illustrated in FIG. III maybe used in conjunction with the tool holder assembly 30 of FIG. III to obtain a constantly aligned center line along the surfaces of flat 36, the center line of cylindrical stem 33, the flat 41 and the cylindrical portion 42 of tool holder 40.

As may be seen from viewing the figures of the subject application and reading the foregoing description of the preferred embodiments, each of the components according to the present invention maybe utilized individually or in combination with each other in a conventional height gage or read-out device to obtain the precise location of the center line of bores and holes in parts in a single step.

What is claimed is:

1. A direct readout center line measuring device comprised of generally triangular shaped tool having two intersecting surfaces with a generally conical configuration ending in a point, and the third intersecting surface being flat; a cylindrical stem attached to said third surface, the center line of said cylindrical stem being in alignment with the point of intersection of said first two surfaces, said cylindrically shaped stem being adpated for mounting in a moveable slide of a height measuring gage assembly.

2. A method of obtaining a direct measurement of the centerline location of a bore or hole comprising the steps of inserting a triangular shaped tool having a cylindrical stem extending therefrom into a measuring device, the point of the triangular shaped tool corresponding to the center line of the cylindrical stem and with the read-out indicia on a height measuring device, and moving the height measuring device to a position wherein the triangular shaped tool corresponds with and aligns with the opening of a bore or hole in a part, and reading directly the dimension from the height measuring device to obtain the location of the center line of the hole or opening being measured.

3. A direct read-out centerline measuring device as set forth in claim 1, further comprising a tool holder consisting of a rectangular shaped bar attached to a cylindrical stem, said cyclindrical stem having a bore extending into the interior thereof, said bore adapted for receiving the cyclindrical stem attached to the third surface of said triangular shaped tool, said rectangular member being positioned so that the centerline of said cyclindrical member aligns with one surface of said rectangular member, said rectangular member adapted for retention within a height gauge to allow a direct readout of the location of a bore centerline.

4. A direct readout centerline measuring device as set forth in claim 1, further comprising a tool holder comprised of a cyclindrical member having a flat surface formed at one end thereof along the longitudinal axis of said cyclindrical member and in alignment with the centerline of said cyclindrical member.

5. A direct height measuring and centerline readout device comprising a triangular shaped contact tool means adapted to be attached to a height measuring device, said triangular shaped contact tool means having one point aligned with its longitudinal centerline, the longitudinal centerline adapted to be positioned for direct alignment with a readout means of said height measuring device, the point of said triangular shaped contact tool means being adpated for insertiton into a bore of a part being checked, whereby the height of the centerline of said bore in a part being measured may be read directly from said readout means of said height measuring device.

* * * * *